(12) United States Patent
Zhang

(10) Patent No.: US 9,743,377 B2
(45) Date of Patent: Aug. 22, 2017

(54) METHOD, SYSTEM AND APPARATUS FOR ACQUIRING CELL LOCATION INFORMATION

(75) Inventor: Dajun Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 13/382,930

(22) PCT Filed: Sep. 25, 2010

(86) PCT No.: PCT/CN2010/077281
§ 371 (c)(1),
(2), (4) Date: Jan. 8, 2012

(87) PCT Pub. No.: WO2011/038658
PCT Pub. Date: Apr. 7, 2011

(65) Prior Publication Data
US 2012/0149393 A1 Jun. 14, 2012

(30) Foreign Application Priority Data
Sep. 29, 2009 (CN) .......................... 2009 1 0093366

(51) Int. Cl.
*H04W 64/00* (2009.01)
*H04W 24/00* (2009.01)
*G01S 5/02* (2010.01)

(52) U.S. Cl.
CPC ......... *H04W 64/003* (2013.01); *H04W 24/00* (2013.01)

(58) Field of Classification Search
CPC ... H04W 64/003; H04W 64/00; H04W 24/10; G01S 5/0236; G01S 5/0268; G01S 5/0273; G01S 19/46; G01S 5/02
(Continued)

(56) References Cited

U.S. PATENT DOCUMENTS 8,135,416 B2 * 3/2012 Zhang .................... G01S 5/021
455/404.2
8,244,275 B2 * 8/2012 Islam .................... G01S 5/0205
455/456.1
(Continued)

FOREIGN PATENT DOCUMENTS

CN 1413058 A 4/2003
CN 1452424 A 10/2003
(Continued)

OTHER PUBLICATIONS

International Search Report issued International Application No. PCT/CN2010/077281, dated Dec. 30, 2010.
(Continued)

*Primary Examiner* — Khawar Iqbal
(74) *Attorney, Agent, or Firm* — Handal & Morofsky LLC

(57) ABSTRACT

A method, a system and an apparatus for acquiring cell location information are disclosed in the embodiments of the present invention. The method includes the following steps: a serving mobile location center acquires the cell antenna location information from a network-side device; the serving mobile location center implements the positioning operation according to the cell antenna location information. In the present invention, the cell antenna location information comprising the information of the longitude, the latitude and the altitude and the like is pre-stored in the evolved Node B (eNodeB), Mobility Management Entity (MME) or Evolved Serving Mobile Location Center (E-SMLC), then according to network planning, the Operation and Maintenance (O&M) beforehand completes the configuration operation of the antenna location information of all the cell in the serving region, thereby further the various kinds of the current positioning technical schemes are improved.

8 Claims, 7 Drawing Sheets

(58) Field of Classification Search
USPC .......................................... 455/456.1–456.6
See application file for complete search history.

(56) References Cited

U.S. PATENT DOCUMENTS

| | | | |
|---|---|---|---|
| 2006/0258369 A1 | 11/2006 | Burroughs et al. | |
| 2008/0096487 A1 | 4/2008 | Masaki | |
| 2010/0041418 A1* | 2/2010 | Edge | H04W 4/02 455/456.2 |
| 2010/0331012 A1* | 12/2010 | Zhang | G01S 5/0242 455/456.2 |
| 2011/0092205 A1* | 4/2011 | Masuda | H04W 60/04 455/435.1 |
| 2011/0098057 A1* | 4/2011 | Edge | G01S 5/0018 455/456.1 |
| 2011/0143771 A1* | 6/2011 | Edge | H04W 4/02 455/456.1 |
| 2011/0312339 A1* | 12/2011 | Kuningas | G01S 5/0226 455/456.1 |
| 2012/0127890 A1* | 5/2012 | Islam | G01S 5/0205 370/252 |
| 2012/0142313 A1* | 6/2012 | Edge | H04W 64/003 455/410 |
| 2012/0264450 A1* | 10/2012 | Kangas | G01S 5/0226 455/456.1 |
| 2015/0094091 A1* | 4/2015 | Stern-Berkowitz | G01S 5/0205 455/456.1 |
| 2016/0302040 A1* | 10/2016 | Burroughs | H04W 64/00 |

FOREIGN PATENT DOCUMENTS

| | | |
|---|---|---|
| CN | 1849525 A | 10/2006 |
| CN | 101035380 A | 9/2007 |

OTHER PUBLICATIONS

Notification of Reexamination issued in Chinese patent application No. 200910093366.7, dated Jan. 25, 2015 (in Chinese).
Notification of Reexamination issued in Chinese patent application No. 200910093366.7, dated Jan. 25, 2015 (in English).
Office Action issued in Chinese Patent Application No. 200910093366.7, dated Oct. 18, 2013 (in Chinese).
Office Action issued in Chinese Patent Application No. 200910093366.7, dated Oct. 18, 2013 (in English).
Office Action issued in Chinese Patent Application No. 200910093366.7, dated May 5, 2013 (in Chinese).
Office Action issued in Chinese Patent Application No. 200910093366.7, dated May 5, 2013 (in English).
Office Action issued in Chinese Patent Application No. 200910093366.7, dated Nov. 26, 2012 (in Chinese).
Office Action issued in Chinese Patent Application No. 200910093366.7, dated Nov. 26, 2012 (in English).
European Patent Office, Extended European Search Report, European Patent Application No. 10819887.0, Dec. 12, 2016.
Huawei, "Location service support by E-UTRAN", 3GPP TSG RAN WG2 #66bis, R2-093906, Jun. 29-Jul. 3, 2009, Los Angeles, USA.
Qualcomm Europe, "Extensions to Alternative #1 for LCS Control Plane Support for EPS", 3GPP TSG SA WG2 Meeting #70, TD S2-090684 Jan. 12-16, 2009, Scottsdale, Phoenix, USA.
3GPP, "3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9)", 3GPP TS 36.305 V1.1.1, Jul. 2009, France.

* cited by examiner

METHOD, SYSTEM AND APPARATUS FOR ACQUIRING CELL LOCATION INFORMATION

The application requires the priority of Chinese patent application, which submitted to the Chinese Patent Office on Sep. 29, 2009, the application No. 200910093366.7, invention name as "method, system and apparatus for acquiring cell location information", with all of its content by reference in this application.

FIELD OF THE PRESENT INVENTION

The present invention relates generally to the field of communication technology, and more particularly to a method, system and apparatus for acquiring cell location information.

BACKGROUND OF THE PRESENT INVENTION

Mobile Location Services is the service, which using UE location to carry out, such as emergency rescue etc. Currently, positioning includes the following two methods: the control Plane Location and SUPL (Secure User-Plane Location). The control Plane Location needs to use Evolved Universal Terrestrial Radio Access Network E-UTRAN signaling links, MME (Mobility Management Entity) send positioning requests to E-SMLC (Evolved Serving Mobile Location Center) to trigger positioning process, and after finishing positioning, the positioning results is returned to the MME by the E-SMLC, E-SMLC, MME, eNodeB, and UE etc. may be involved in the positioning process.

As shown in FIG. 1, is a positioning structure diagram related to E-UTRAN, it comprises E-SMLC, SLP (SUPL Location Platform), MME, eNodeB and UE. Therein, E-SMLC, is used for transforming the location which the user required into the corresponding E-UTRAN measurement parameter, and selecting the positioning method; calculating the final results and the accuracy of the returned location.

MME, is used for providing mobility management for LCS (Location Service), comprising reporting UE mobility to E-SMLC/GMLC (Gateway Mobile Location Center).

eNodeB, is used for providing the related measurement results of positioning services to E-SMLC, and transmitting the auxiliary information which positioning services needed.

UE, is used for providing the related measurement results of positioning services to E-SMLC.

In the present LTE (Long Term Evolution) system, the methods of positioning based on control plane location comprises: CELL ID+TA (Timing Advance)+AOA (Angle of Arrival) scheme, OTDOA (Observed Time Difference Of Arrival), and A-GNSS (Advance Gateway Navigation Satellite System) etc., for calculating the location of UE, these schemes need to acquire the cell antenna location information.

Therein, the fundamental of CELL ID+TA+AOA scheme is: calculating the location, by acquiring the angle between the direction of UE to the eNodeB (base station) and the true north (AOA), and acquiring Timing Advancement of UE (TA). In LTE, TA can be maintained by UE, or ban be acquired by base station measurement.

eNodeB get the transmitting signal AOA by the smart antenna, UE is on the ray which is the Node B as a starting point, and the angle of ray direction counterclockwise rotation from the north is AOA.

UE-side timing is shown in FIG. 2, the timing offset between up and downlink wireless frame is $N_{T4}$.

UE side timing is shown in FIG. 3, it can be considered that in general, $N_{T4}$ always reflects twice the delay caused by the distance d. According to $N_{T4}$, it can be calculated the distance between the UE and the eNode B. As shown in FIG. 4, UE is in the circle which the eNode B is as the center and the distance is as the radius. According to the above information and the serving cell location information, E-SMLC can calculate the location of UE.

However, the current CELL ID+TA+AOA positioning scheme is lack of methods to acquire the servicing cell location information, and thus can not be calculated the location of UE according to the servicing cell location information.

SUMMARY OF THE PRESENT INVENTION

The embodiments of the present invention provide a method, system and apparatus for acquiring cell location information to realize UE positioning accurately.

The embodiments of the present invention provide a method for acquiring cell location information, comprising the following steps:

Serving mobile location center acquires the cell antenna location information from a network-side device;

Said serving mobile location center implements the positioning operation according to the cell antenna location information.

The embodiments of the present invention provide a system for acquiring cell location information, comprising:

Network-side device, is used for storing cell antenna location information and the corresponding serving cell identification;

Serving mobile location center, is used for acquiring cell location information from a network-side device, and implementing the positioning operation according to said cell antenna location information.

The embodiments of the present invention provide a network-side device for acquiring cell location information, comprising:

A storing module, is used for storing the cell antenna location information and the corresponding serving cell identification;

A receiving module, is used for receiving the requiring message sent by said serving mobile location center;

A researching module, connecting with said receiving module, is used for researching said cell antenna location information corresponding to said serving cell identification, which carried by said requiring message;

A sending module, connecting with said researching module, is used for sending response message to said serving mobile location center, which carrying said cell antenna location information.

The embodiments of the present invention provide a network-side device for acquiring cell location information, comprising:

A storing module, is used for storing cell antenna location information and the corresponding serving cell identification;

A sending module, is used for sending requiring message to said serving mobile location center, which carrying the cell antenna location information of all cells.

Comparing with present technology, the invention including the following advantages:

In the embodiments of present invention, the cell antenna location information comprising the information of the longitude, the latitude and the altitude and the like is pre-stored in the eNodeB, MME or ESMLC, then according to network planning, the Operation and Maintenance (O&M) beforehand completes the configuration operation of the antenna location information of all the cell in the serving region, thereby further the various kinds of the current positioning technical schemes are improved.

BRIEF DESCRIPTION OF THE DRAWINGS

In order to represent the technical program of the embodiments of the present invention more clearly, the drawings need to be used in the representation of embodiments will be introduced briefly. It is obvious that the following described drawings are only some embodiments of the present invention. For general technical personnel in this field, other drawings can be got according to these drawings on this premise of without paying any creative work.

DETAILED DESCRIPTION OF THE EMBODIMENTS OF THE PRESENT INVENTION

In the following parts, detailed, clear and complete descriptions of the technology programs of the present invention are made combined with drawings of the embodiments. It is clear that the embodiments of the present invention described here are only parts of the embodiments of the present invention. According to the embodiments of the present invention, any other embodiments made by technical personnel of the field in the absence of creative work are all belong to the scope of the patent protection of the invention.

In the embodiments of present invention, the cell antenna location information comprising the information of the longitude, the latitude and the altitude and the like is pre-stored in the eNodeB, MME or ESMLC, then according to network planning, the Operation and Maintenance (O&M) beforehand completes the configuration operation of the antenna location information of all the cell in the serving region.

Figure 1:
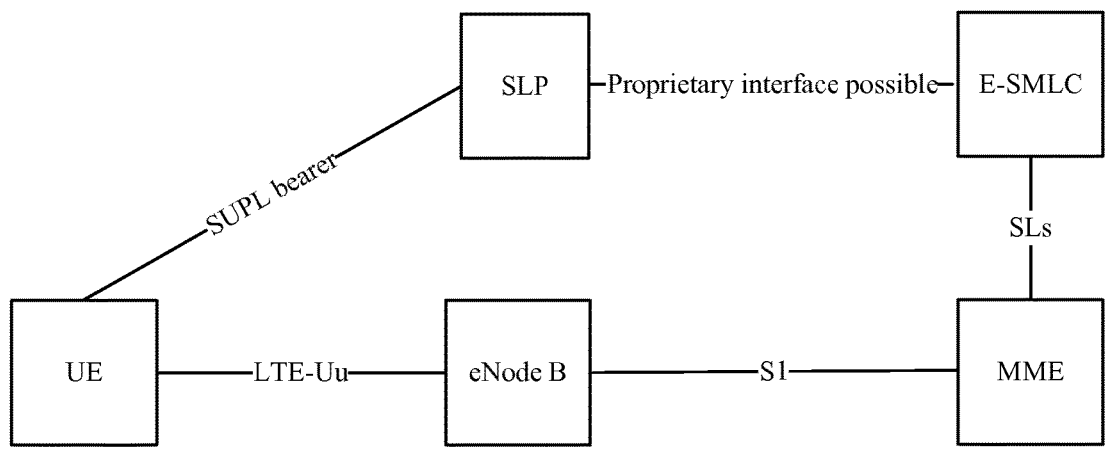
FIG. 1 is a positioning structure diagram related to E-UTRAN in prior art.
Figure 2:
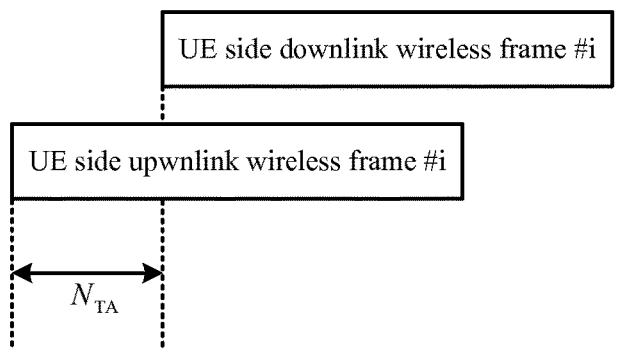
FIG. 2 is a schematic diagram of UE-side timing offset between up and down frame in prior art.
Figure 3:
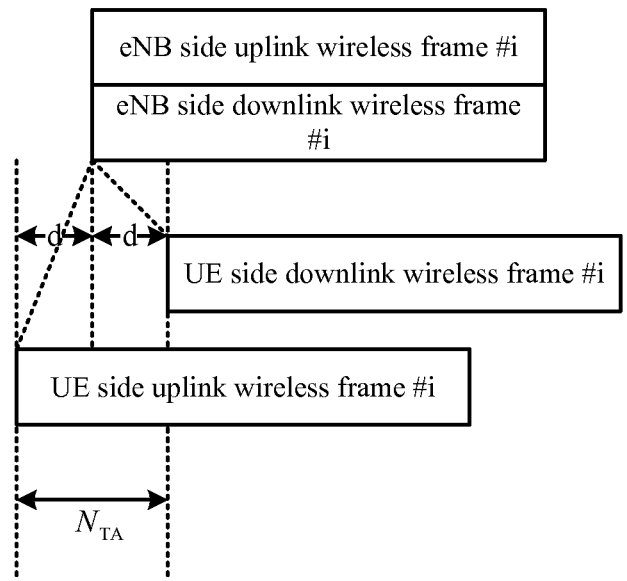
FIG. 3 is a schematic diagram of base station side timing offset between up and down frame in prior art.
Figure 4:
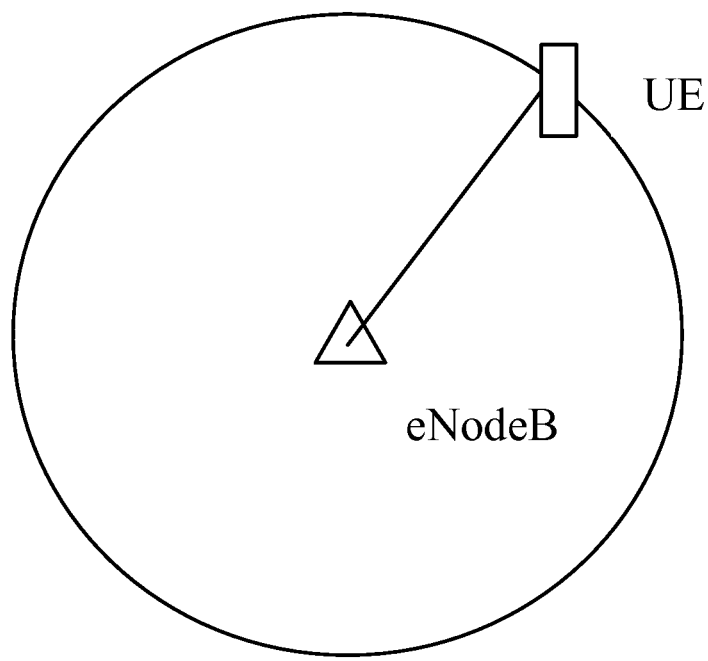
FIG. 4 is a schematic diagram of location relationship between UE and eNodeB in prior art.
Figure 5:
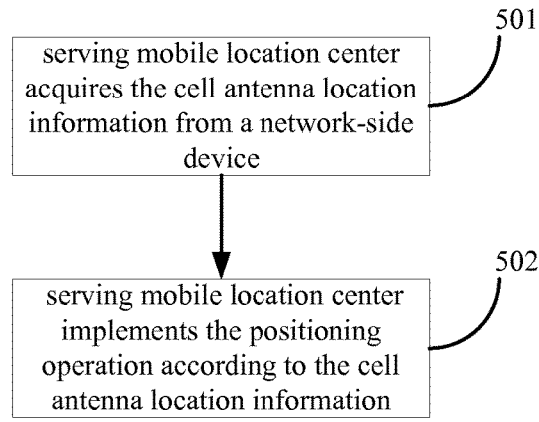
FIG. 5 is a flow diagram of a method for acquiring cell location information for embodiment 1 of the present invention.

The embodiments of the present invention provide a method for acquiring cell location information, as shown in FIG. 5, comprising the following steps:

S501, serving mobile location center acquires the cell antenna location information from a network-side device.

S502, serving mobile location center implements the positioning operation according to the cell antenna location information.

Figure 6:
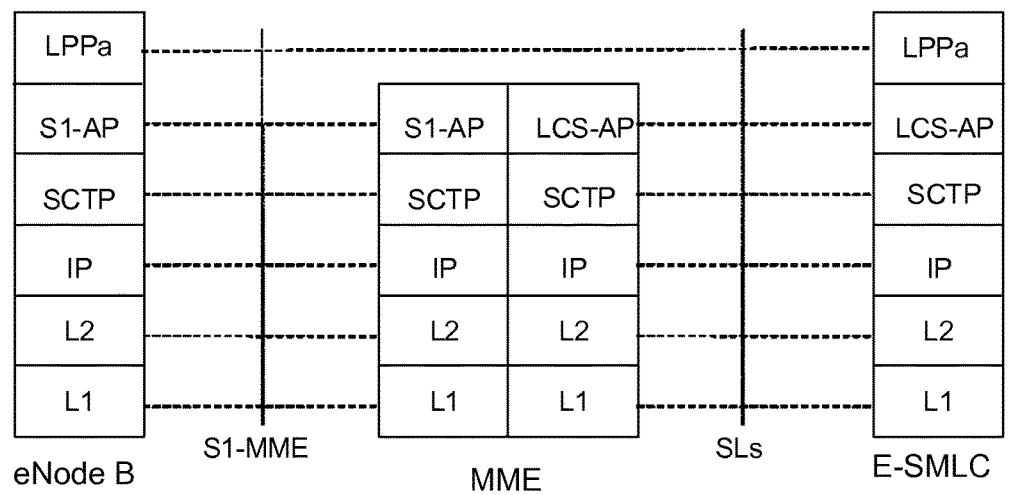
FIG. 6 is a schematic diagram of LPPa protocol stack for the embodiments of the present invention.

When the cell antenna location information is pre-configured in the eNodeB, in order to calculating UE location, it needs to adopt appropriate method to send the information to ESMLC. The adoptable methods comprising: informing ESMLC by LPPa (LTE Positioning Protocol A), S1AP (S1 Application Protocol) or LCSAP (Location Service Application Protocol); or informing MME, and all cell antenna location information is stored in MME and under the control of the MME. In the present invention, the method for acquiring cell antenna location information is prior art, repeat no more. Therein, LPPa protocol stack is shown in FIG. 6.

When the cell antenna location information is pre-configured in MME, the information can be sent to the ESMLC by LCSAP.

When the cell antenna location information is pre-configured in the ESMLC, ESMLC acquire directly from the local according to positioning requirement.

Figure 7:
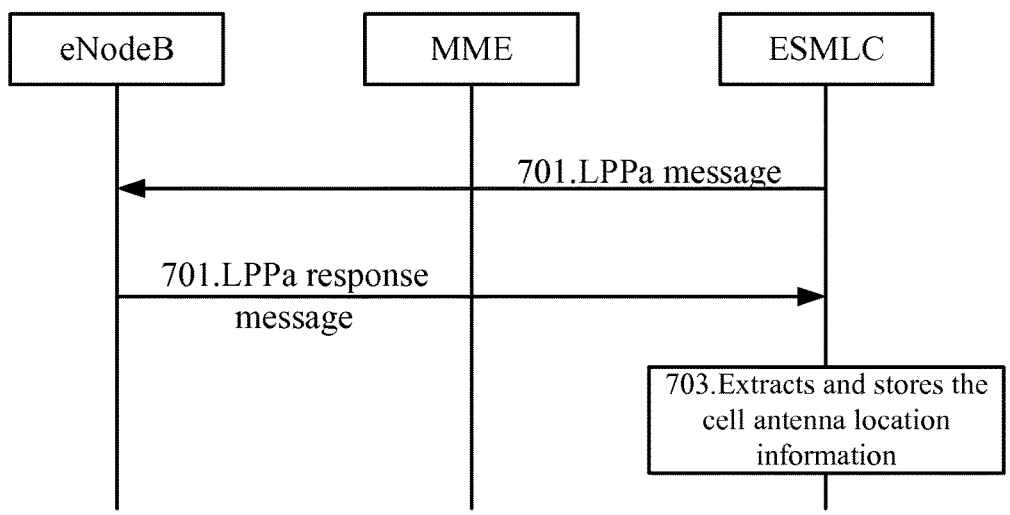
FIG. 7 is a flow diagram of a method for acquiring cell location information for embodiment 1 of the present invention.

Embodiment 1 of the present invention, when the cell antenna location information is pre-configured in the eNodeB, the eNodeB maintains a table entry, the serving cell location information and the corresponding ECGI are stored in the table entry. ESMLC and eNodeB can send the cell antenna location information by LPPa, as shown in FIG. 7, comprising the following steps:

Step 701, when ESMLC requiring positioning services to each user equipment, or when ESMLC needs to acquire the cell location information, the ESMLC send one LPPa message to eNodeB, which carrying the serving cell ECGI (Evolution Cell Global ID).

Step 702, After receiving the LPPa message, the eNodeB researches whether there is the cell antenna location information corresponding to the serving cell ECGI in local database, and if so, send the serving cell location information carrying in the LPPa response message to the ESMLC.

Step 703, ESMLC receives the LPPa response message returned by the eNodeB, extracts and stores the cell antenna location information carrying in the LPPa response message, then implements subsequent operations according to the cell antenna location information, for example, implements UE positioning and other positioning technology operations.

In the embodiment 1 of the present invention, the cell location information is pre-configured in the eNodeB, ESMLC can interact LPPa message with the eNodeB, achieve sending the cell antenna location information to the ESMLC, to provide ESMLC can implement variety of positioning technology operations according to the cell antenna location information.

Figure 8:
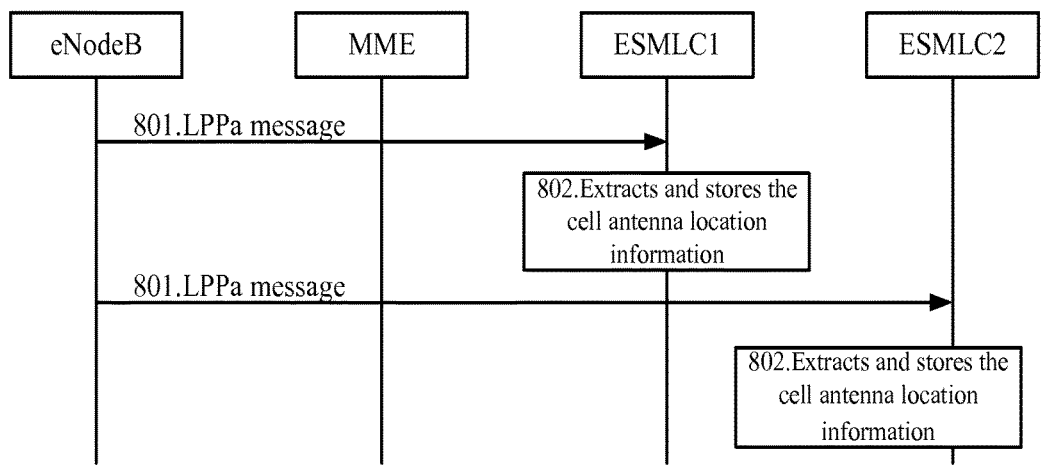
FIG. 8 is a flow diagram of a method for acquiring cell location information for embodiment 2 of the present invention.

In the embodiment 2 of the present invention, the cell location information is pre-configured in the eNodeB, the eNodeB maintains a table entry, the serving cell location information and the corresponding ECGI are stored in the table entry. The eNodeB actively report the cell antenna location information by LPPa, as shown in FIG. 8, comprising the following steps:

Step 801, After initialization (such as power or restart), the eNodeB actively send multiple LPPa messages to all relevant ESMLC, which carrying all cell antenna location information under the control of the eNodeB. Therein, eNodeB and ESMLC is many to many relationship, so the eNodeB need to determine which ESMLC should be sent to; There are several LPPa messages that there are several ESMLC needs to be sent.

Step 802, After receiving the LPPa message, the ESMLC extracts the cell antenna location information and stores in the local, and then, implements subsequent operations according to the cell antenna location information.

Step 803, If the cell configuration has changed, then the serving cell location information changes, the cell location information can be updated by the LPPa message, repeat steps 801 to step 802.

In the embodiment 2 of the present invention, the cell location information is pre-configured in the eNodeB, the eNodeB can actively report the cell location information to ESMLC by LPPa message, to provide the ESMLC can implement subsequent operations according to the cell antenna location information.

Figure 9:
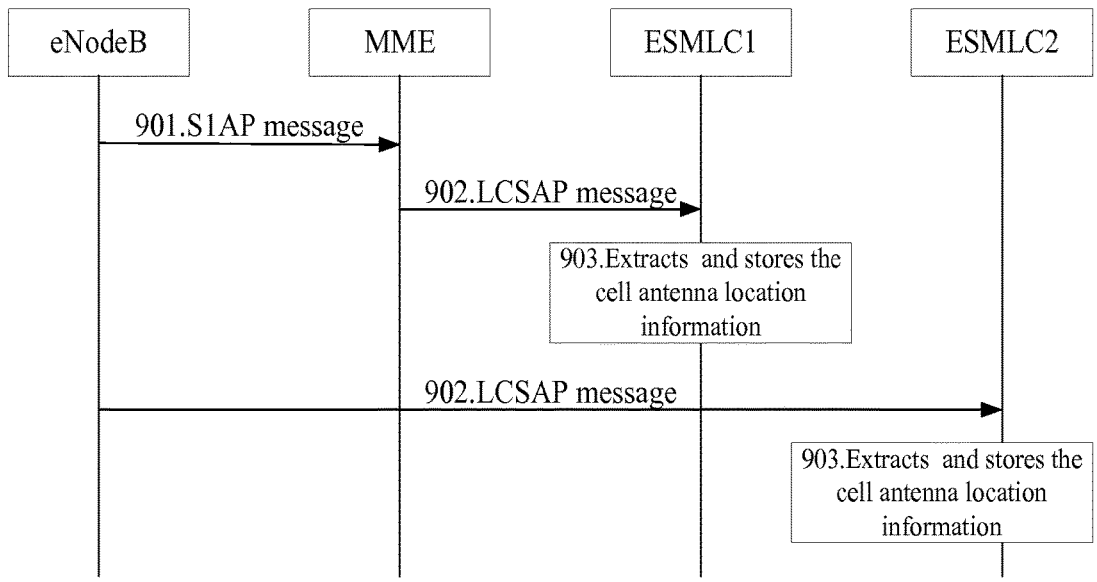
FIG. 9 is a flow diagram of a method for acquiring cell location information for embodiment 3 of the present invention.

In the embodiment 3 of the present invention, the cell location information is pre-configured in the eNodeB, the eNodeB maintains a table entry, the serving cell location information and the corresponding ECGI is stored in the table entry. The eNodeB actively report the cell antenna location information by S1AP, as shown in FIG. 9, comprising the following steps:

Step 901, After initialization, the eNodeB actively send multiple S1AP message to the corresponding MME, which carrying all cell antenna location information under the control of the eNodeB.

Step 902, After receiving the S1AP message, the MME transforms the S1AP message into LCSAP message which carrying the cell antenna location information under the control of the eNodeB, and send the LCSAP message to connecting ESMLC.

Step 903, After receiving the LCSAP message, the ESMLC extracts the cell antenna location information and stores in the local, and then, implements subsequent operations according to the cell antenna location information.

Step 904, If the cell configuration has changed, then the serving cell location information changes, the cell location information can be updated by the S1AP message, repeat steps 901 to step 902.

In the embodiment 3 of the present invention, the cell location information is pre-configured in the eNodeB, the eNodeB can actively report the cell location information to ESMLC by S1AP message, to provide the ESMLC can implement subsequent operations according to the cell antenna location information.

Figure 10:
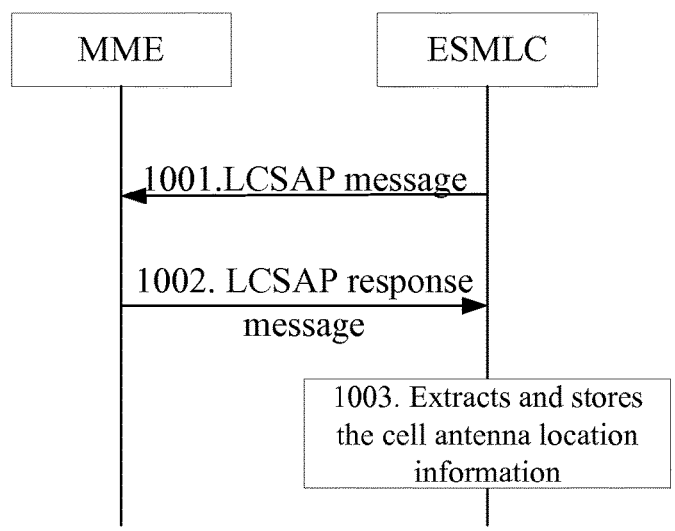
FIG. 10 is a flow diagram of a method for acquiring cell location information for embodiment 4 of the present invention.

In the embodiment 4 of the present invention, the cell location information is pre-configured in the MME, the MME maintains a table entry, the cell location information and the corresponding ECGI is stored in the table entry. The MME send the cell antenna location information by LCSAP, as shown in FIG. 10, comprising the following steps:

Step 1001, when ESMLC requiring positioning services to each user equipment, or when ESMLC needs to acquire the cell location information, the ESMLC send one LCSAP message to MME, which carrying the serving cell ECG.

Step 1002, After receiving the LCSAP message, the MME researches whether there is the cell antenna location information corresponding to the serving cell ECGI in local database, and if so, send the serving cell location information carrying in the LCSAP response message, which returns to the ESMLC.

Step 1003, ESMLC receives the LCSAP response message returned by the MME, extracts and stores the cell antenna location information carrying in the LCSAP response message, then implements subsequent operations according to the cell antenna location information, for example, implements UE positioning and other positioning technology operations.

In the embodiment 4 of the present invention, the cell location information is pre-configured in the MME, ESMLC can interact LCSAP message with the MME, achieve sending the cell antenna location information to the ESMLC, to provide ESMLC can implement variety of positioning technology operations according to the cell antenna location information.

Figure 11:
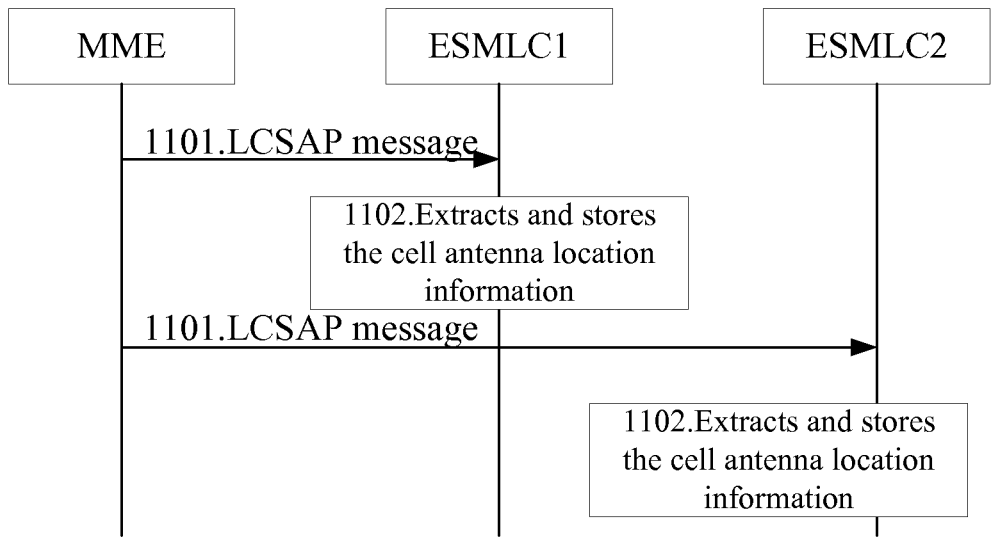
FIG. 11 is a flow diagram of a method for acquiring cell location information for embodiment 5 of the present invention.

In the embodiment 5 of the present invention, the cell location information is pre-configured in the MME, the MME maintains a table entry, the cell location information and the corresponding ECGI is stored in the table entry. The MME actively send the cell antenna location information to the ESMLC by LCSAP, as shown in FIG. 11, comprising the following steps:

Step 1101, the MME can build LCSAP message periodically which carrying all configured cell antenna location information.

Step 1102, the MME send the LCSAP message to all connecting ESMLC.

Step 1103, ESMLC receives the LCSAP response message sent by the MME, extracts and stores the cell antenna location information carrying in the LCSAP response message, then implements subsequent operations according to the cell antenna location information, for example, implements UE positioning and other positioning technology operations.

In the embodiment 5 of the present invention, the cell location information is pre-configured in the MME, ESMLC can actively report the cell location information to ESMLC by LCSAP message, to provide the ESMLC can implement subsequent operations according to the cell antenna location information.

The embodiments of the present invention provide a system for acquiring cell location information, such as LTE, LTE-A etc., comprising:

Network-side device, is used for storing cell antenna location information and the corresponding serving cell identification;

Serving mobile location center, is used for acquiring cell location information from a network-side device, and implementing the positioning operation according to the cell antenna location information.

When the network-side device is eNodeB,

The eNodeB, specifically used for after receiving the LPPa message sent by the serving mobile location center, researching the cell antenna location information corresponding to the serving cell identification carrying in the LPPa message, and returning the cell antenna location information to the serving mobile location center by the LPPa response message; or Sending at least one LPPa message to the serving mobile location center, which carrying the cell antenna location information under the control of the eNodeB; or Sending a S1AP message to MME, which carrying the cell antenna location information under the control of the eNodeB, to provide the MME transform the S1AP message into LCSAP message, and send the LCSAP message to connecting ESMLC.

When the network-side device is MME,

The MME, specifically used for after receiving LCSAP message sent by the serving mobile location center, researching the corresponding cell antenna location information, and returning cell antenna location information to the serving mobile location center by the LCSAP response message; or Sending LCSAP message to the serving mobile location center, which carrying the cell antenna location information configured by MME.

Figure 12:
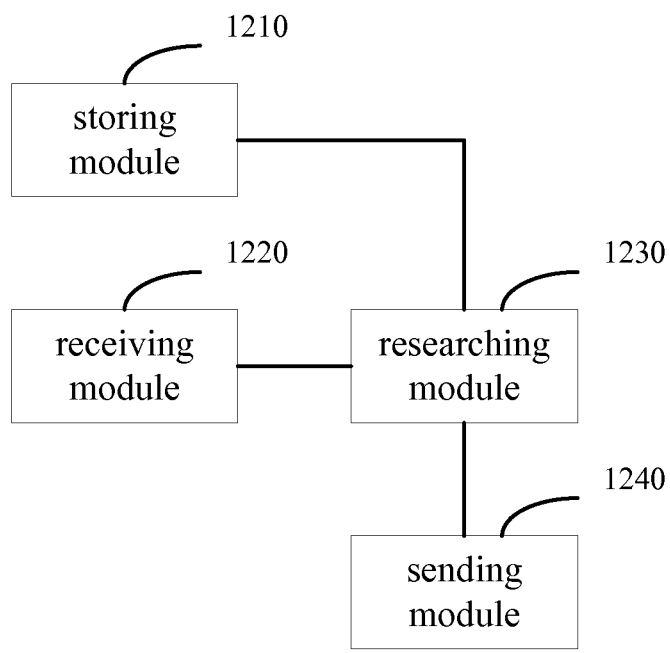
FIG. 12 is a structure diagram of a network-side device for the embodiment for the present invention.

The embodiments of the present invention provide a network-side device for acquiring cell location information, as shown in FIG. 12, comprising:

A storing module 1210, is used for storing the cell antenna location information and the corresponding serving cell identification;

A receiving module 1220, is used for receiving the requiring message sent by serving mobile location center;

A researching module 1230, connecting with said receiving module, is used for researching said cell antenna location information corresponding to said serving cell identification, which carried by said requiring message;

A sending module 1240, connecting with said researching module 1230, is used for sending response message to said serving mobile location center, which carrying said cell antenna location information.

When said network-side device is evolved Node B,

Said receiving module 1220, specifically used for receiving LPPa message sent by said serving mobile location center, which carrying the serving cell identification;

Said sending module 1240, specifically used for sending LPPa response message to said serving mobile location center, which carrying the cell antenna location information.

When said network-side device is MME,

Said receiving module 1220, specifically used for receiving LCSAP message sent by said serving mobile location center, which carrying the serving cell identification;

Said sending module 1240, specifically used for sending LCSAP response message to said serving mobile location center, which carrying said cell antenna location information.

Figure 13:
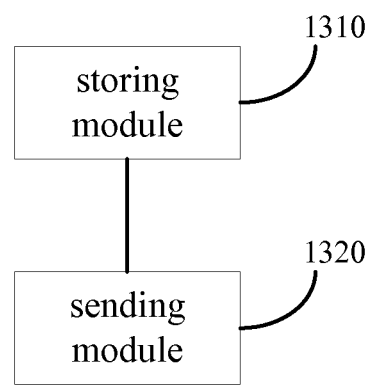
FIG. 13 is other structure diagram of a network-side device for the embodiment of the present invention.

The embodiments of the present invention provide a network-side device for acquiring cell location information, as shown in FIG. 13, comprising:

A storing module 1310, is used for storing cell antenna location information and the corresponding serving cell identification;

A sending module 1320, is used for sending send requiring message to said serving mobile location center, which carrying the cell antenna location information of all cells.

When said network-side device is evolved Node B,

Said sending module 1320, specifically used for sending at least one LPPa message to said serving mobile location center, which carrying the cell antenna location information under the control of eNodeB.

When said network-side device is evolved Node B,

Said sending module 1320, specifically used for sending a S1AP message to MME, which carrying the cell antenna location information under the control of eNodeB, to provide the MME transform said S1AP message into LCSAP message, and send the LCSAP message to all ESMLC connected to.

When said network-side device is MME,

Said sending module 1320, specifically used for Sending LCSAP message to the serving mobile location center, which carrying all cell antenna location information configured by MME.

In the embodiments of the present invention, the cell antenna location information comprising the information of the longitude, the latitude and the altitude and the like is pre-configured in the eNodeB, MME or ESMLC, then according to network planning, the O&M beforehand completes the configuration operation of the antenna location information of all the cell in the serving region, thereby further the various kinds of the current positioning technical schemes are improved.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium, including a number of instructions for making a computer device (such as personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The invention disclosed above is only a few specific embodiments, however, the present invention is not limited to, any of the technical personnel in this field should be able to think of the changes fall into the scope of protection of this invention.

The invention claimed is:

1. A method for acquiring cell location information, comprising:
   acquiring, by a serving mobile location center, cell antenna location information from a network-side device;
   implementing, by the serving mobile location center, positioning operation according to the cell antenna location information;
   wherein, the network-side device is evolved Node B eNodeB, and the cell antenna location information and corresponding serving cell identification are stored in the eNodeB,
   the step of acquiring, by a serving mobile location center, cell antenna location information from a network-side device, specifically comprising:
   the serving mobile location center sends a LTE Positioning Protocol A LPPa message to the eNodeB, which carrying serving cell identification;
   the eNodeB researches the corresponding cell antenna location information according to the serving cell identification, and returns the cell antenna location information to the serving mobile location center by the LPPa response message;

the eNodeB sends a S1 Application Protocol S1AP message to Mobility Management Entity MME, which carrying the cell antenna location information under controlling of the eNodeB;

after receiving the S1AP message, the MME transforms the S1AP message into Location Service Application Protocol LCSAP message which carrying the cell antenna location information under controlling of the eNodeB, and sends the LCSAP message to connecting ESMLC.

2. The method according to claim 1, wherein the network-side device is eNodeB, and the cell antenna location information and corresponding serving cell identification are stored in the eNodeB, the step of acquiring, by a serving mobile location center, cell antenna location information from a network-side device, specifically comprising:

the eNodeB sends at least one LPPa message to the serving mobile location center, which carrying the cell antenna location information under controlling of the eNodeB.

3. The method according to claim 1, wherein the network-side device is MME, and the cell antenna location information and the corresponding serving cell identification are stored in the MME, the step of acquiring, by a serving mobile location center, cell antenna location information from a network-side device, specifically comprising:

the serving mobile location center sends LCSAP message to the MME, which carrying the serving cell identification;

the MME researches the corresponding cell antenna location information according to the serving cell identification, and returns the cell antenna location information to the serving mobile location center by the LCSAP response message.

4. The method according to claim 1, wherein the network-side device is MME, and the cell antenna location information and the corresponding serving cell identification are stored in the MME, the step of acquiring, by a serving mobile location center, cell antenna location information from a network-side device, specifically comprising:

the MME sends LCSAP message to the serving mobile location center, which carrying the cell antenna location information configured by the MME.

5. A system for acquiring cell location information, comprising:

a network-side device, configured to store cell antenna location information and corresponding serving cell identification;

serving mobile location center, configured to acquire cell antenna location information from the network-side device, and implement positioning operation according to the cell antenna location information; wherein, the network-side device is eNodeB, and the cell antenna location information and the corresponding serving cell identification are stored in the eNodeB, the eNodeB, specifically configured to after receiving a LPPa message sent by the serving mobile location center, research the cell antenna location information corresponding to the serving cell identification, and return the cell antenna location information to the serving mobile location center by the LPPa response message; or send at least one LPPa message to the serving mobile location center, which carrying the cell antenna location information under controlling of the eNodeB; or send a S1 Application Protocol (S1AP) message to Mobility Management Entity (MME), which carrying the cell antenna location information under controlling of the eNodeB, to provide the MME transform the S1AP message into LCSAP message, and send the LCSAP message to connecting ESMLC;

after receiving the S1AP message, the MME transforms the S1AP message into Location Service Application Protocol LCSAP message which carrying the cell antenna location information under controlling of the eNodeB, and sends the LCSAP message to connecting ESMLC.

6. The system according to claim 5, wherein the network-side device is MME, the MME, specifically configured to after receiving LCSAP message sent by the serving mobile location center, research the corresponding cell antenna location information, and return the cell antenna location information to the serving mobile location center by the LCSAP response message; or send LCSAP message to the serving mobile location center, which carrying the cell antenna location information configured by the MME.

7. A network-side device, comprising:

a storing module, configured to store cell antenna location information and corresponding serving cell identification;

a receiving module, configured to receive a requiring message sent by a serving mobile location center;

a researching module, connecting with the receiving module, configured to research the cell antenna location information corresponding to the serving cell identification, which carried by the requiring message;

a sending module, connecting with the researching module, configured to send response message to the serving mobile location center, which carrying the cell antenna location information;

wherein, when the network-side device is evolved Node B, and the cell antenna location information and the corresponding serving cell identification are stored in the eNodeB, the receiving module, specifically configured to receive a LPPa message sent by the serving mobile location center, which carrying the serving cell identification;

the sending module, specifically configured to send a LPPa response message to the serving mobile location center, which carrying the cell antenna location information;

the sending module, further configured to send a S1 Application Protocol S1AP message to Mobility Management Entity MME, which carrying the cell antenna location information under controlling of the eNodeB; and receiving module further configured to, after receiving the S1AP message, the MME transforms the S1AP message into Location Service Application Protocol LCSAP message which carrying the cell antenna location information under controlling of the eNodeB, and sends the LCSAP message to connecting ESMLC.

8. The network-side device according to claim 7, wherein when the network-side device is MME, the receiving module, specifically configured to receive LCSAP message sent by the serving mobile location center, which carrying the serving cell identification;

the sending module, specifically configured to send LCSAP response message to the serving mobile location center, which carrying the cell antenna location information.

\* \* \* \* \*